United States Patent [19]

Schiff

[11] Patent Number: 4,630,283
[45] Date of Patent: Dec. 16, 1986

[54] FAST ACQUISITION BURST MODE SPREAD SPECTRUM COMMUNICATIONS SYSTEM WITH PILOT CARRIER

[75] Inventor: Leonard N. Schiff, Mercer County, N.J.

[73] Assignee: RCA Corporation, Princeton, N.J.

[21] Appl. No.: 755,921

[22] Filed: Jul. 17, 1985

[51] Int. Cl.⁴ .......................... H03D 3/24; H04B 1/06
[52] U.S. Cl. .......................................... 375/1; 375/2.2; 375/97; 375/120; 329/122; 455/260
[58] Field of Search ........................ 375/1, 2.1, 96, 97, 375/119, 120, 2.2; 455/260; 329/50, 122

[56] References Cited

U.S. PATENT DOCUMENTS

| | | | |
|---|---|---|---|
| 4,112,372 | 9/1978 | Holmes et al. | 325/321 |
| 4,188,582 | 2/1980 | Cannalte et al. | 325/58 |
| 4,291,409 | 9/1981 | Weinburg et al. | 375/1 |
| 4,319,358 | 3/1982 | Sepp | 375/1 |
| 4,435,822 | 3/1984 | Spencer et al. | 375/1 |
| 4,485,477 | 11/1984 | Nossen | 375/96 |
| 4,527,275 | 7/1985 | Russell | 375/1 |
| 4,583,048 | 4/1986 | Gumacos et al. | 329/122 |
| 4,584,710 | 4/1986 | Hansen | 375/97 |

Primary Examiner—Robert L. Griffin
Assistant Examiner—Raymond C. Glenny

Attorney, Agent, or Firm—Joseph S. Tripoli; Robert L. Troike; William H. Meise

[57] ABSTRACT

A high frequency code division multiple access spread spectrum (CDMA SS) communications system includes multiple transmitters and their associated receivers, and a pilot carrier source. In order to reduce errors in the receiver IF frequency due to unavoidable differences between the desired transmitted carrier and receiver local oscillator (LO), the transmitted carrier ferquency is related to the pilot frequency. The receiver phase-locks the pilot carrier to the local oscillator, thereby providing an IF data signal with reduced frequency error. The IF data signal is multiplied by sine and cosine demodulating signals related to the local oscillator frequency to produce inphase (I) and quadrature (Q) components of the received data signal. The I and Q signals are applied to code matched filters, which produce filtered or decoded signals the amplitudes of which are related to the phase error between the demodulating signals and the IF carrier. A logic arrangement responds to the decoded signals to generate a control signal which step-corrects the demodulating signal to the correct phase. Correction can occur within one or a few bit intervals, thereby allowing burst mode communications while maintaining high throughput for the multiple users of the communication system.

20 Claims, 11 Drawing Figures

FAST ACQUISITION BURST MODE SPREAD SPECTRUM COMMUNICATIONS SYSTEM WITH PILOT CARRIER

BACKGROUND OF THE INVENTION

This invention relates to spread spectrum communications systems and more particularly to systems using matched filters for fast acquisition in burst mode spread spectrum communications and using a pilot carrier to control the receiver downconversion.

Spread spectrum communication systems are extremely useful for rejecting intentional or unintentional interference, to lower the probability of detection of a transmission, for combating multipath transmission problems such as echoes, and to provide concurrent multiple access communications in a spectrum reuse mode. These advantages are described, for example, in the text "Spread Spectrum Communications" edited by Cook and Ellersick, published by IEEE Press, 1983, and in the article "Theory of Spread Spectrum Communications—Editorial" by Pickholtz et al., printed in IEEE Transactions on Communication, Volume COM-30, pages 855–884, May 1982. In the context of a system for transmitting data between two earth stations via a satellite transponder, spread spectrum transmission reduces the vulnerability to interference from both terrestrial sources and from other satellite-related sources. Such an arrangement also provides reuse of the same frequency spectrum by a plurality of users in a code division multiple access (CDMA) mode. In such a system, the quality of the signal received at any receiver as measured by the bit error rate (BER) depends upon the number of transmitters simultaneously using the spectrum. The type of interference caused by simultaneous use of the same frequency spectrum is known as co-user interference. The number of receivers simultaneously receiving signals in the common portion of the frequency spectrum or in the common bandwidth is not a factor in establishing the interference. If all the potential users of a particular bandwidth transmit information continuously to their respective receivers, then the number of actual users is the same as the number of potential users who are actually active. Many potential users do not transmit data continuously, but instead have a limited amount of data to communicate, which can be transmitted by means of occasional bursts of data. For example, the amount of data to be transmitted by a particular transmitter might be sufficient to warrant transmission to its receivers only 10% of the time, and during the remaining 90% of the time it has no data to send. Since the bit error rate of signals transmitted in a common bandwidth depends upon the number of transmitters simultaneously occupying the bandwidth, the number of potential users actually assigned to that bandwidth may far exceed the number that could actually use the bandwidth if the transmissions were simultaneous. For example, one thousand potential transmitters might be assigned to a common bandwidth based upon the expectancy of an average 10% use. This means that out of 1,000 potential transmitters, on the average only 100 are actually transmitting at any one time. A 10% use or even less may be anticipated, for example, if the users are retail merchants who occasionally wish to use the system to verify the legitimacy of credit card purchases. This percentage of use may be termed a "duty cycle", corresponding to the ratio of transmitting to nontransmitting time in radar terminology.

The very large ratio of potential users to actual users which appears to be possible for low duty cycles is vastly reduced if the intended receivers of the transmissions cannot quickly lock onto the desired transmission. For example, in the case in which a potential user actually uses the assigned bandwidth 10% of the time, he might be active for an interval such as 0.5 seconds during which data is transmitted, and then his transmitter would be quiescent for an average of 4.5 seconds, corresponding to a duty cycle of 0.5 seconds/5 seconds of 10%. If the spread spectrum receiver to which the transmission is made requires 1 second to acquire or lock onto the spread spectrum transmission to be received, the transmitter must be active for 1 second in addition to the 0.5 second data transmission time. Consequently, the transmitter would actually be using the common bandwidth for 1.5 seconds out of every 5 seconds, corresponding to a 30% duty cycle or activity rate rather than 10%. Rather than 1,000 potential users assigned to the common bandwidth as in the case of 10% duty cycle, the 30% duty cycle causes a reduction in the number of potential users to 333 for the assumed BER. Thus, the long acquisition time can create a substantial reduction in the usefulness of valuable electromagnetic spectrum.

Conventional spread spectrum receivers acquire lock by a bootstrap procedure. In this procedure, a local clock derived from an oscillator selected to be close to the chip rate of the received signal clocks a pseudorandom sequence (PRS) generator which generates a PRS signal corresponding to the PRS by which the transmission to be received was encoded. The received signal is downconverted to IF by a local oscillator, and the IF signal so generated is mixed with or multiplied by the PRS sequence. Because of slight difference between the chip rate of the received signal and the chip rate of the local PRS signal, the two sequences drift in phase relative to each other and eventually are in phase coincidence. At the moment phase coincidence of the received and locally generated PRS signals occurs, the output of the multiplier will produce pure IF carrier signal. This IF carrier signal is applied to a local oscillator controlling phase lock loop (PLL) which will acquire phase lock within a certain time after the two pseudorandom sequences come into phase coherence. When locked, the phase lock loop forces the local oscillator to a frequency equal to the IF frequency, so that the output of the mixer is the PRS encoded data. Once the PRS encoded data is generated, a second PLL responds to the chip rate signal to produce a continuous chip rate clock. When locked, this output clock is substituted for the locally generated chip rate clock to drive the local PRS generator, whereupon acquisition is complete. Such a system is described in U.S. patent application Ser. No. 513,737 filed by Jul. 14, 1983 in the name of Mangulis et al. This type of bootstrap acquisition procedure may be relatively slow. Each of the two PLL's has its own lock up time, and their locking must occur sequentially. The time required for the locally generated and incoming or received PRS signals to come into phase coincidence depends upon the difference between their chip frequencies. If the locally generated and received PRS clock rates are very close to each other, only a small change in phase occurs per unit time, so that phase coincidence may not occur for a substantial period of time. On the other hand, if the locally generated and received PRS chip rate are very different, the sequences come into phase quickly, but remain in phase for such a short period that the local oscillator PLL has very low effective loop gain, which results in slow acquisition, or in inability to acquire lock. Among the strategies for speeding up acquisition by varying the local chip rate to attempt to cause the locally generated and received PRS sequences to move into phase more quickly is a switch arrangement described in U.S. Pat. No. 4,319,358 issued Mar. 9, 1982, to Sepp, which selects an auxilary clock generator during acquisition.

Another strategy for fast acquisition involves incoherently converting the pseudorandom sequence encoded data IF signal to baseband with quadrature related local oscillator (LO) signals to produce inphase (I) and quadrature (Q) components of the baseband signal. If one of the I or Q components has a maximum value while the other has a zero value, the local oscillator is inphase with the IF carrier frequency. However, the local oscillator signal will generally be in some random phase relative to the IF carrier, and the I and Q components will have some finite magnitude less than the maximum possible value. The I and Q components of the received signal are applied to a pair of code matched filters which respond to the received PRS code to produce impulse signals at the time the received PRS code matches the filter code. The amplitude of the pulses produced by the two matched filters is related to the phase angle between the local oscillator signal and the IF carrier component of the received signal. These amplitudes are evaluated by a logic circuit to establish the phase error, and a control signal is generated which is applied to the local oscillator to perform a step correction of the phase, whereby the local oscillator frequency and phase become subhstantially identical or coherent with the frequency and phase of the IF carrier of the received signal. When this local oscillator signal is mixed with the IF signal, the desired baseband coded data (or its I and Q components) is generated. At this time, the output of one of the matched filters would be at a maximum amplitude and the output amplitude of the other matched filter will be substantially zero. The impulses produced by the matched filters may be processed to provide the desired data, or other known techniques may be used to extract the data from the baseband encoded data. Such an arrangement is described in U.S. patent application Ser. No. D 705,710 filed Feb. 26, 1985, now U.S. Pat. No. 4,538,048, patented in April 1986, in the name of Gumacos et al. These systems are suitable for burst communications at low carrier frequencies. When such systems are used at high carrier frequencies or in conjunction with moving platforms such as aircraft, satellites and the like, phase acquisition may be slow or may not occur at all because of the modulation of the incoherently demodulated I and Q signals by the difference frequency between the IF carrier and the demodulating signal. It would be desirable to have a CDMA spread spectrum communications system providing access to multiple transmitters and multiple receivers, operating in a burst mode in which the receivers rapidly select the desired signal by code identification of signals in the common bandwidth.

SUMMARY OF THE INVENTION

A code division multiple access (CDMA) spread spectrum communications system includes a transmitter for transmitting data encoded with a pseudorandom sequence over a transmission channel. The receiver includes a down converter for down converting the received encoded data signal to a range of IF frequencies to produce encoded IF data centered on an IF carrier frequency, and also includes a mixer driven by mutually quadrature components of a demodulating signal to produce inphase and quadrature components of the demodulated pseudorandom encoded data signal. The demodulated inphase and quadrature components are each applied to a code matched filter to produce decoded I and Q signals having amplitudes related to the relative phase between the demodulating signal and the IF carrier. The amplitudes of the decoded inphase and phase quadrature signals are evaluated by a logic circuit which generates a control signal which represents the difference in phase between the demodulating signal and the IF carrier. The control signal controls the phase of the demodulating signal to approach the phase of the IF carrier. The IF carrier and the demodulating signal in the receiver may undesirably be substantially different in frequency. This may occur if the signals transmitted from the transmitter to the receiver by way of the transmission path are at a very high frequency such that inherent accuracy limitations of the transmitter upconverter and receiver downconverter oscillators allow such differences, or if the transmission path includes rapidly moving components such as a satellite tranceiver which cause Doppler frequency shifts. A large frequency difference may result in substantial phase errors between the demodulating signal and the IF signal in the receiver. This in turn may result in amplitude errors in the baseband I and Q signal evaluated by the code matched filter. The phase angle determining logic circuit in the receiver may interpret such erroneous amplitude signals in such a fashion as to slow or inhibit acquisition of proper demodulating signal phase. This problem is avoided by a pilot signal source common to the entire CDMA system. The transmitter signal and the pilot signal are at related frequencies and pass together through the transmission path, experiencing the same effects. The receiver downconverter locks the downconverted IF pilot signal to a locally generated reference signal, which forces the simultaneously downconverted IF data signal to be near the frequency of the locally generated demodulating signal.

DESCRIPTION OF THE DRAWING

FIG. 7b illustrates an embodiment of a programmable counter usable in the arrangement of FIG. 7a;

DETAILED DESCRIPTION OF THE INVENTION

Figure 1:
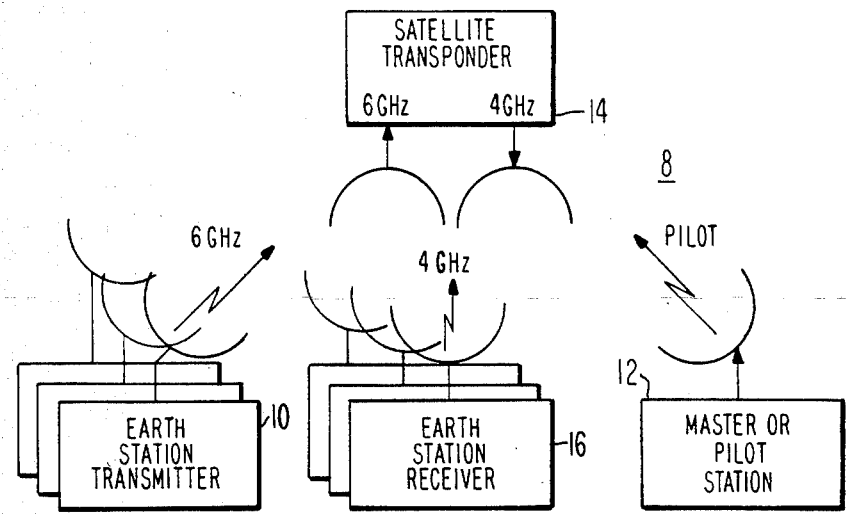
FIG. 1 is a block diagram illustrating a CDMA spread spectrum communication system according to the invention including earth station transmitter and receiver, a satellite transponder and a pilot signal transmitter.

FIG. 1 illustrates a multiple user code division multiple access (CDMA) spread spectrum (SS) communications system 8 in which a plurality of transmitters, one of which is illustrated as 10, transmits data encoded by phase shift keying (PSK) a carrier by means of a pseudorandom sequence (PRS) and by upconverting the encoded data to a transmitting frequency illustrated as 6 Gigahertz (GHz). Each of the earth station transmitters represented by 10 transmits using a unique pseudorandom sequence. All of the Earth station transmitters occupy a similar band of frequencies centered on 6 GHz. A master or pilot station 12 associated with the communication system 8 generates a pilot carrier which is upconverted into the 6 GHz range and which is received by a corresponding portion of a satellite transponder illustrated as 14. The satellite transponder converts the data and pilot signals to a band of frequencies near 4 GHz and retransmits them. An Earth station receiver illustrated as 16 represents one of a plurality of receivers capable of receiving the signals retransmitted by transponder 14. Each receiver selects from among a plurality of SS signals occupying the predetermined bandwidth near 4 GHz by downconverting the band to a range of IF frequencies, demodulating the resulting IF data signal to produce a plurality of baseband SS signals, and decoding the desired baseband signal from among the plurality of baseband signals by means of a replica of its unique identifying PRS sequence.

Figure 2:
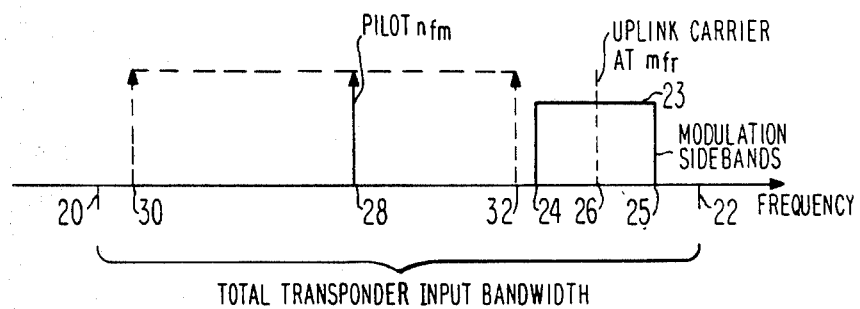
FIG. 2 is a frequency line illustrating the relationship of the pilot signal frequency, the data signal and the bandwidth of the satellite transponder of FIG. 1.

FIG. 2 is a frequency line illustrating as the region between lines 20 and 22 the total satellite transponder input bandwidth, as 24 certain modulation sidebands centered about an uplink carrier frequency at 26, and the pilot frequency 28 lying in a frequency range 30 to 32 outside of the frequency of modulation sidebands 24. Modulation sidebands 24 include the sidebands attributable to all of the transmitters 10 which are simultaneously using the electromagnetic spectrum lying between frequencies 24 and 25 centered on uplink carrier frequency 26. it should be emphasized that while there is an uplink carrier frequency, the upconverted sidebands 24 exhibit no identifiable carrier.

Figure 3:
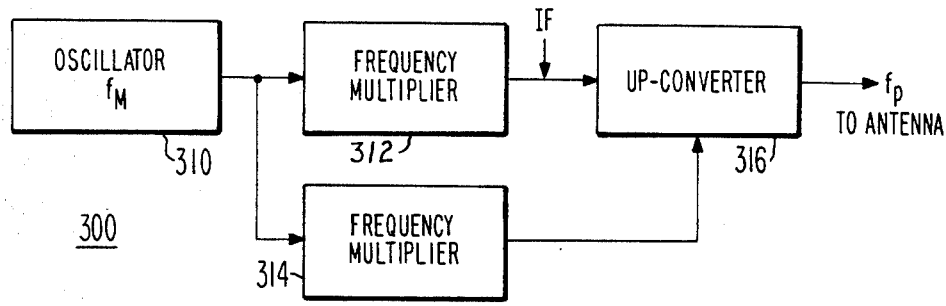
FIG. 3 is a block diagram illustrating a pilot signal generator according to an embodiment of the invention.

FIG. 3 is a block diagram of a pilot signal generator 300. Generator 300 includes an oscillator 310 for generating a signal at a frequency $f_M$ which is applied to a first frequency multiplier 312 and to a second frequency multiplier 314 for multiplying oscillations at frequency $f_M$ by first and second integers to produce intermediate signals at an intermediate frequency (IF). The intermediate signals are applied to an upconverter 316 which includes multipliers and filters (not illustrated). The intermediate signals applied to upconverter 316 are coherent in that they are both derived from the same frequency source. Upconverter 316 translates the intermediate frequency signal to a pilot frequency $f_p$ at a frequency such as 28 of FIG. 2 which is transmitted by an antenna (not illustrated). When so translated, the pilot signal frequency $f_p$ is an exact integer multiple of $f_M$.

Figure 4:
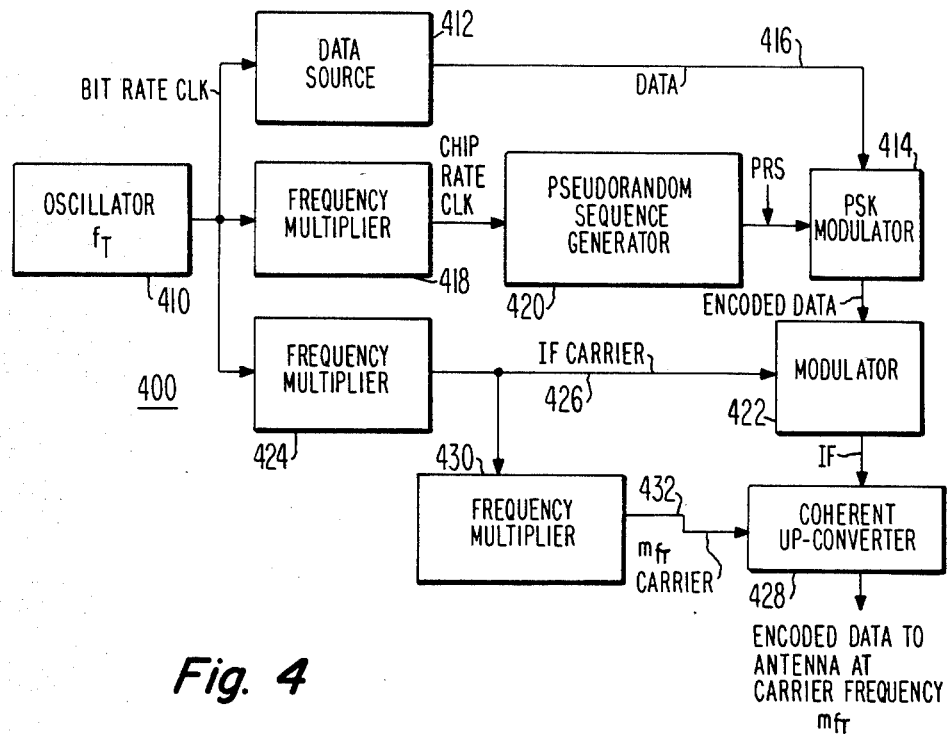
FIG. 4 is a block diagram of a data transmitter in accordance with the embodiment of the invention.

FIG. 4 is a block diagram of a data transmitter adapted for use in the transmission system of FIG. 1. In FIG. 4, an oscillator 410 produces a signal at a frequency $f_T$. The frequency of signal $f_T$ is nominally the same as frequency $f_M$ of pilot generator 300, but may differ therefrom due to unavoidable errors attributable to the accuracy of the oscillators. Signal $f_T$ is nominally of the same frequency as $f_M$ in order to aid in making the frequency difference between the IF carrier and the demodulating signal at the receiver small, as described below. If the frequencies of $f_T$ and $f_M$ are established by conventional overtone type quartz crystals, their accuracy is in the range of $10^{-7}$ to $10^{-8}$. The output signal from oscillator 410 is applied as the bit rate clock to a data source 412 for clocking data to be transmitted from source 412 to phase-shift keying (PSK) modulator 414 by way of a conductor 416. Signals are also applied from oscillator 410 to a frequency multiplier 418 which multiplies the frequency of the signals to produce a chip rate clock signal. The chip rate clock signal is applied to a pseudorandom sequence generator 420 for generating a PRS signal which is applied to a second input of modulator 414 for PSK modulating the data to produce encoded data which is applied to an input terminal of a modulator 422. Oscillator signal is also applied from oscillator 410 to a second frequency multiplier 424 for multiplying the frequency of signal $f_T$ by a second integer to produce an IF carrier signal on a conductor 426 for application to a second input terminal of modulator 422. Generally speaking, there is no necessity that the second integer or second IF frequency be the same as the integer and IF frequency of FIG. 1. Modulator 422 translates the encoded data to an IF frequency related to the IF carrier frequency and applies it to an input terminal of a coherent upconverter 428. The IF carrier signal on conductor 426 is also applied to a third frequency multiplier 430 for further frequency multiplication by a third integer which is not necessarily the same as the first or second integer to produce on a conductor 432 a carrier signal at a frequency $mf_T$ which is applied to a second terminal of upconverter 428. The input signals to upconverter 428 are coherent since they are derived from the same source. Upconverter 428 translates the IF signal from modulator 422 through the use of the carrier from conductor 432 to produce encoded data centered at a carrier frequency $mf_T$ for application to an antenna (not illustrated in FIG. 4) by which it is transmitted to a satellite transponder or directly to receivers of the system. The encoded data at a carrier frequency $mf_T$ is an exact integer multiple of frequency $f_T$.

As transmitted, the pilot signal is at $nf_M$ and the data signal is centered at $mf_T$, where n and m are integers. Frequencies $f_M$ and $f_T$ are nominally equal. If $f_M$ and $f_T$ were unaffected by frequency errors, they would both be at frequency $f_M$, and the pilot and data transmitted signals would be at frequencies $nf_M$ and $mf_M$, respectively. The difference between the two transmitted frequencies is exactly $(m-n) f_M$ if $f_M = f_T$, and is approximately $(m-n) f_M$ when unavoidable accuracy errors are considered. When the transmitted signals pass through the satellite transponder and are frequency converted, Doppler effects cause relatively large frequency variations. However, these variations affect the pilot and data signals alike, so that the difference between the translated pilot and data carrier frequencies remain substantially constant.

Figure 5:
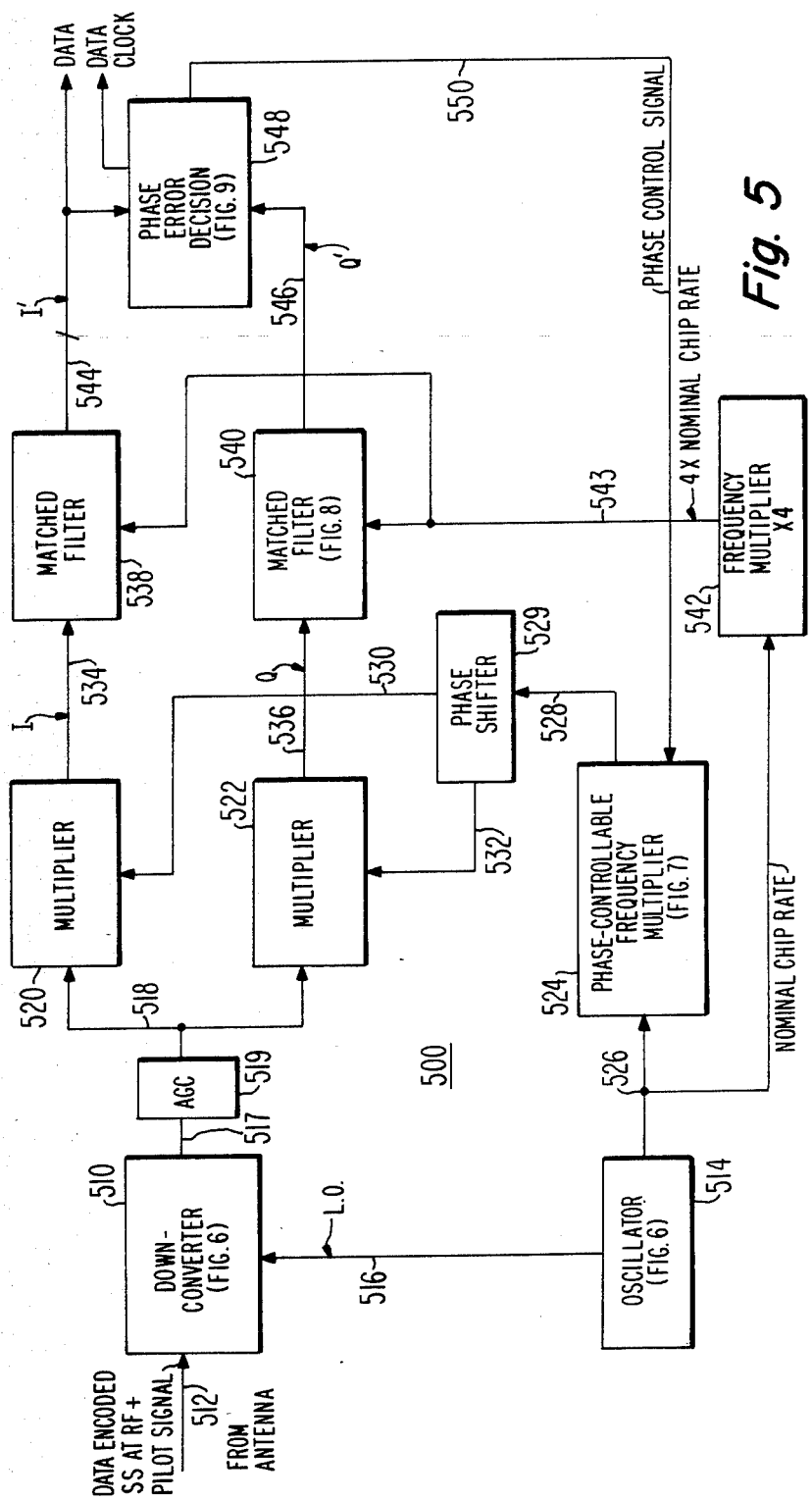
FIG. 5 is a general block diagram of a portion of a receiver according to an embodiment of the invention for fast acquisition of signals transmitted by the transmitter of FIG. 4 with the aid of a pilot signal generated by an arrangement illustrated in conjunction with FIG. 3.

FIG. 5 is a block diagram of a receiver 500 adapted for receiving a pilot carrier and burst mode spread spectrum signals in a commonly utilized bandwidth, and for selecting the desired signal from the many CDMA signals in the common bandwidth. In FIG. 5, a downconverter 510 receives from a receiving antenna (not illustrated in FIG. 5) the pilot signals and all the spread spectrum data signals within the commonly utilized bandwidth. Downconverter 510 downconverts the pilot signal together with the CDMA spread spectrum data to a range of IF frequencies in such a manner that the pilot frequency when converted to IF is nominally equal in frequency to a local oscillator (LO) signal generator by an oscillator 514, as described below. The IF frequency may be in the range of 70 MHz for satellite retransmissions in the range of 4 GHz. When frequency converted in this manner, the spread spectrum data signal at IF frequencies appears on a conductor 517 at the output of downconverter 510. Because the downconverted pilot signal is forced to be equal to the local oscillator signal on conductor 516, and because the downconversion of the pilot signal and the spread spectrum signals from the satellite transponder, as described above, occurs by the same process, the difference of the carrier frequency of the downconverted spread spectrum data and the frequency of the local oscillator on conductor 516 equals the nominal difference of the uplink carrier frequency $mf_T$ to pilot frequency $nf_M$. Thus, as described below, large frequency differences between the IF carrier of the spread spectrum data and the demodulating signal are avoided. As in the case of the transmitted signal, the data signals when downconverted to a range of IF frequencies do not exhibit an identifiable carrier. The downconverted IF spread spectrum data signals are applied over conductor 517 to input terminals of multipliers 520 and 522 by way of an AGC amplifier 519.

A signal is applied from oscillator 514 to a phase controllable frequency multiplier 524 by way of conductor 526. The signal on conductor 526 is coherent with the local oscillator signal on conductor 516. The frequency multiplied signal generated by multiplier 524 is a demodulating signal which is applied over a conductor 528 to a phase shifter illustrated as 530 which generates mutually quadrature phase signals which are related to the demodulating signal. These mutually quadrature "components" or the demodulating signal are applied over conductors 530 and 532 to multipliers 520 and 522 respectively. Multipliers 520 and 522 demodulate the IF data signal by multiplying the downconverted spread spectrum data signal on conductor 518 by the mutually quadrature phase signals or components on conductors 530 and 532 to produce inphase (I) and quadrature (Q) signals on conductors 534 and 536 respectively. The I and Q signals are applied to matched filters 538 and 540 respectively.

The I and Q signals applied from multipliers 520 and 522 to matched filters 538 and 540 respectively, are the chip rate pseudorandom sequences amplitude modulated by the difference between the frequency of the output signal of phase controllable frequency multiplier 524 and the frequency of the received IF carrier. Thus, the I signal is amplitude modulated at the difference frequency rate and the Q signal is also amplitude modulated at the rate of the difference frequency. The IF frequency at the output of downconverter 510 must be close enough to the local oscillator frequency on conductor 516 so that the amount of modulation of the I and Q signals over a time duration equal to the delay of matched filters 538 and 540 is small. If matched filters 538 and 540 match the PRS code of the received signal for a duration of one data bit or have a delay equal to one data bit, the IF carrier frequency of the downconverted signal on conductor 518 must be close enough to the frequency of the demodulating signal on conductor 528 so that only a small portion of a cycle of the difference frequency occurs during one data bit interval. For example, if the data rate is $10^4$ bits per second (BPS), the duration of one bit is $10^{-4}$ seconds, and if it is arbitrarily assumed that the modulation of one of the I and Q signals should not exceed 0.13 dB, the maximum phase change of the difference frequency is given by $$\Delta\phi = \cos^{-1}(10^{-0.13/20})$$

which corresponds to about 10°. The maximum permissible difference frequency between the IF carrier and the local oscillator is therefore given by $$\Delta f = (\Delta\phi(BPS)/360° = (10° (10^4)/360°)$$

which corresponds to about 278 Hertz.

Matched filters 538 and 540 receive the I and Q signals from multipliers 520 and 522, respectively, and clock them therethrough in a manner described below at a rate which is an integer multiple of the nominal chip rate. The frequency multiplied chip rate signal is derived from a frequency multiplier 542 which receives the chip rate clock signal from oscillator 514. In the illustrated embodiment, the matched filters are clocked at four times the chip rate. The outputs of matched filters 538 and 540 are narrow pulses or impulse signals, the relative amplitudes of which are related to the phase difference between the demodulating signals on conductors 530 and 532 and the carrier of the IF data signal on conductor 518. The outputs of matched filters 538 and 540 are applied by way of conductors 544 and 546 to a phase error decision or logic circuit which generates on a conductor 550 a control signal for controlling the phase of frequency multiplier 524 for controlling the phase of the demodulation of the IF signal in multipliers 520 and 522. As described below, demodulation acquisition occurs within one bit interval and is corrected thereafter at each bit interval. The desired demodulated data is taken from conductor 544.

Figure 6:
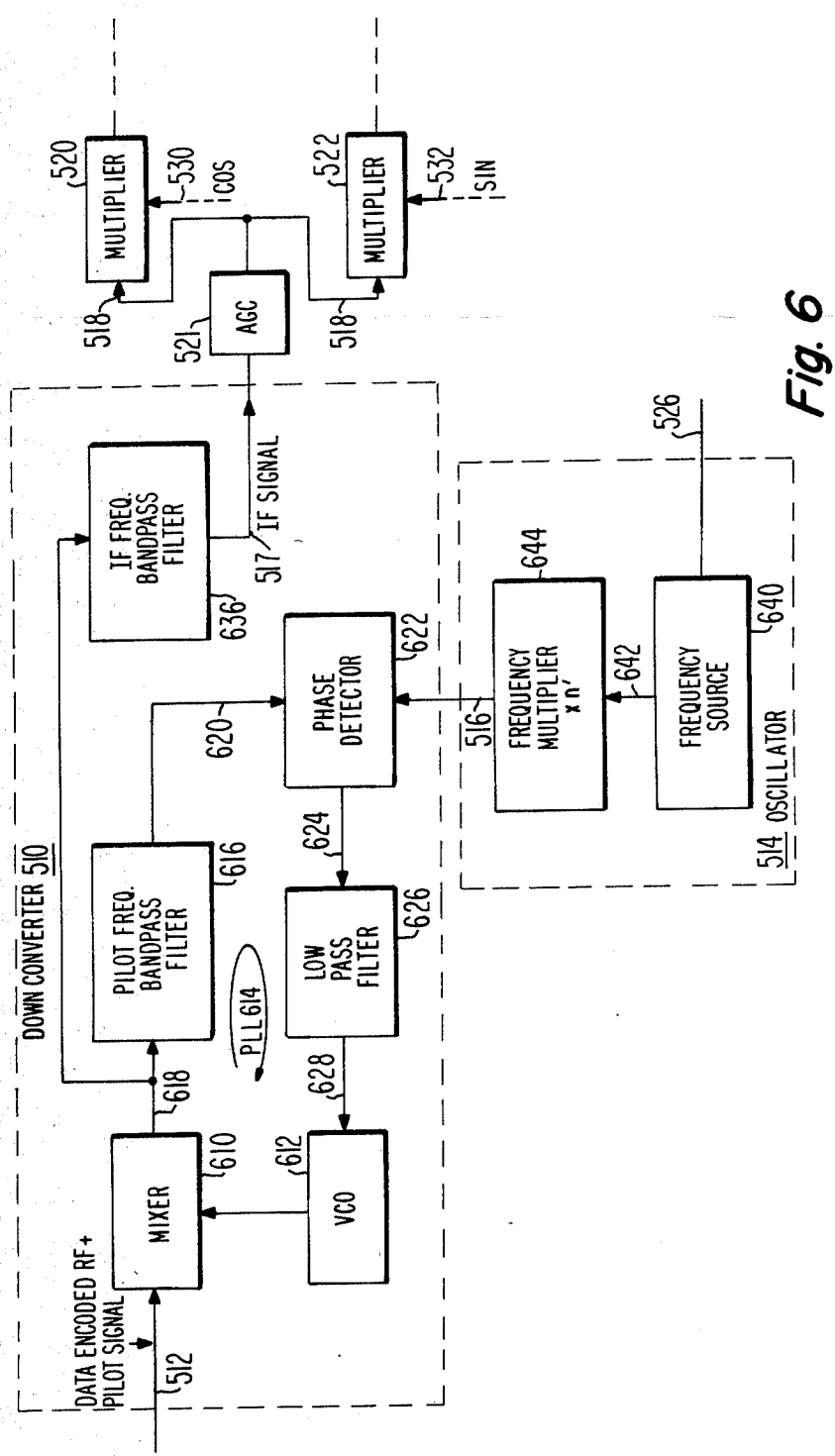
FIG. 6 is a block diagram including details of a downconverter of the receiver of FIG. 5.

FIG. 6 illustrates details of downconverter 510 and oscillator 514. In FIG. 6, data encoded radio frequency (RF) signals and the pilot signal are applied over conductor 512 to a mixer 610 which is part of downconverter 510. Mixer 610 receives signals from a voltage control oscillator (VCO) 612 which is controlled by a phase lock loop (PLL) 614. PLL 614 includes a pilot signal bandpass filter 616 which receives downconverted data encoded signal and downconverted pilot signal from mixer 610 by way of conductor 618 and which passes only the downconverted pilot signal by way of a conductor 620 to a first input terminal of a phase detector 622. Phase detector 622 compares the downconverted pilot signal to a reference signal applied to a second input of phase detector 622 by way of conductor 516. Phase detector 622 produces on conductor 624 a signal representing the frequency and phase difference between the downconverted pilot signal and the reference signal. The signal on conductor 624 is filtered by a low pass filter 626 which generates on conductor 628 a control signal which controls the frequency of VCO 612. Phase lock loop 614 controls VCO 612 such that the frequency of the downconverted pilot signal always equals the frequency of the reference signal on conductor 516. The data encoded RF signal is converted by the same VCO signal to a range of IF frequencies. The downconverted pilot and the downconverted data IF signal are applied to an IF frequency bandpass filter 636 which rejects the pilot signal and passes only the band of frequencies including the desired data signal and undesired data signals arising from other users occupying the same bandwidth. These signals are applied by way of conductor 517 to AGC circuit 521 in which the peak amplitude is controlled to be substantially constant, and from AGC circuit 521 by way of conductor 518 to multipliers 520 and 522 for multiplication by a signal which ideally is equal in frequency and phase to the carrier of the IF signals on conductor 518.

Oscillator 514 includes a stable frequency source 640 which in the illustrated embodiment produces a signal at a frequency nominally equal to $f_M$ on conductor 642 for application to a frequency multiplier 644 which multiplies the frequency of the signal on conductor 642 by n' to produce on conductor 516 a frequency n' times the frequency from source 640.

In operation before the acquisition process is completed, multipliers 520 and 522 multiply the signal on conductor 518 by quadrature related components of a demodulating signal which is incoherent with the IF carrier. That is, the demodulating signal components on conductors 530 and 532 are not in frequency and phase lock with the carrier of the downconverted signal on conductor 518. This results in multiplication of the demodulated I and Q signals by cosine $\theta$ and sine $\theta$, respectively, where angle $\theta$ progresses at a rate dependent on the difference in frequency between the IF carrier of the data signal on conductor 518 and the frequency of the demodulating signal on conductors 530 and 532.

Figure 7A:
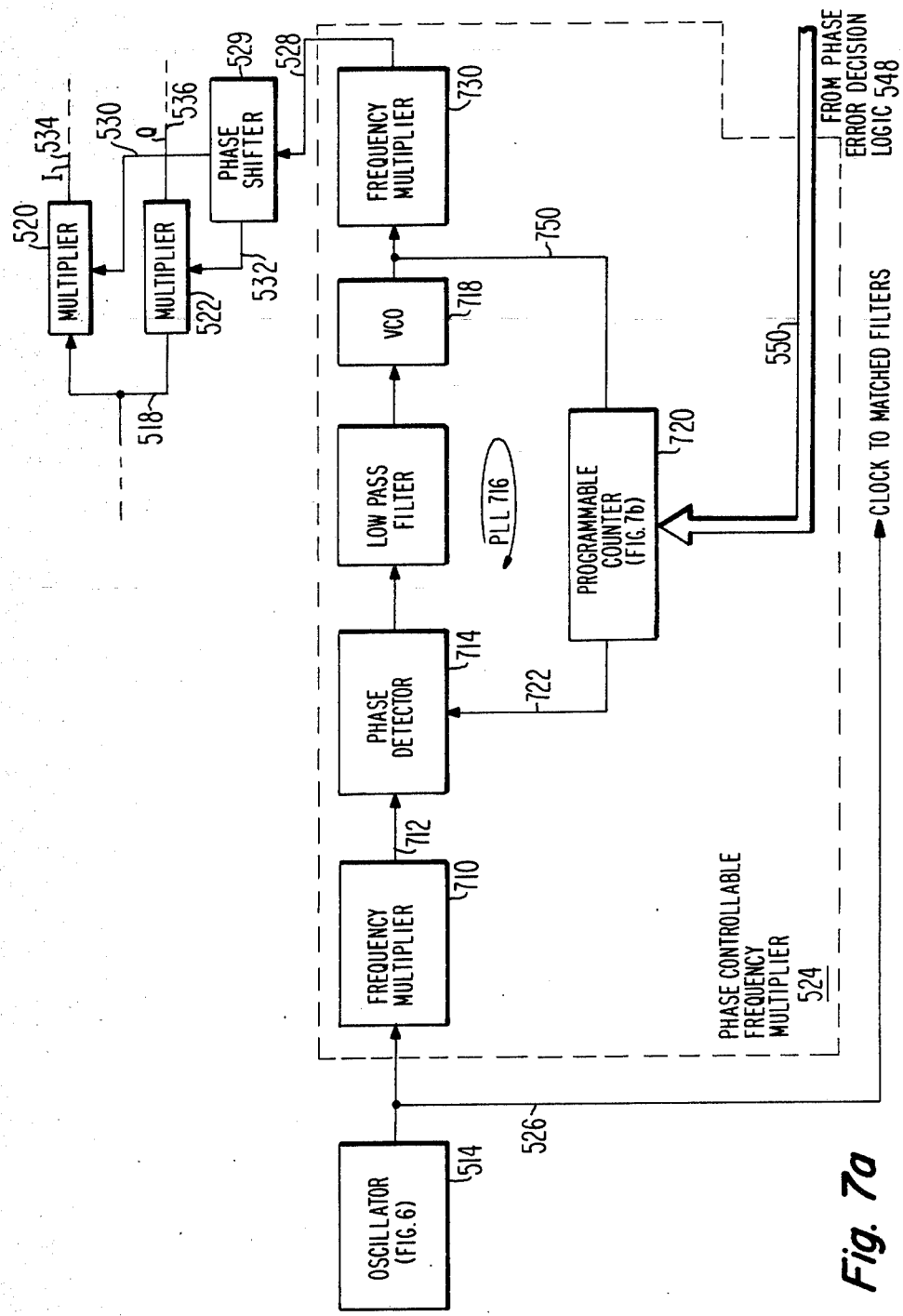
FIG. 7a is a block diagram illustrating details of a frequency multiplier of the receiver of FIG. 5.

FIG. 7a illustrates details of phase controllable frequency multiplier 524. In FIG. 7a, oscillator 514 produces signals on conductor 526 at a frequency nominally equal to frequency $f_M$ which are applied to a frequency multiplier 710 which multiplies the frequency of the signals on conductor 526 to produce on conductor 712 $f_M$ multiplied by an integer for application to a phase detector 714. Phase detector 714 is part of a phase lock loop 716 which controls the frequency of the signal produced by a VCO 718 to equal an integer multiple of the frequency of the signal on conductor 712. The magnitude of the integer multiplier is established by the programming of a programmable counter 720 which divides the output signal produced by VCO 718 to produce a reference signal which is applied to phase detector 714 by way of conductor 722. The output of VCO 718 is further multiplied in frequency by a frequency multiplier 730 to produce a demodulating signal on conductor 528 at a frequency nominally equal to $(n-m)f_T$. Phase shifter 529 produces cosine and sine components of the demodulating signal on conductors 530 and 532 for application to multipliers 520 and 522, respectively.

In operation during the acquisition mode, phase controllable frequency multiplier 524 is essentially uncontrolled in phase and produces a demodulating signal which results in incoherent demodulation of the IF data signals on conductor 518. Consequently, the incoherently demodulated I and Q signals on conductors 534 and 536 will have relatively arbitrary amplitudes relative to each other.

The amplitude of the demodulated signal on conductors 534 and 536 is multiplied by the cosine and sine, respectively, of the phase angle between the demodulating signal applied over conductor 530 to multiplier 520 and the IF carrier. Under ideal conditions, the cosine component of the demodulating signal on conductor 530 will be in-phase with the IF carrier, and the sine component of the demodulating signal on conductor 532 will be in phase quadrature therewith. Under these conditions, the amplitude of the demodulated I signal on conductor 534 will be a maximum (multiplication by cos 0°), and the amplitide of the Q signal on conductor 536 will be zero (multiplication by sin 0°). As described below, during the acquisition mode the actual amplitudes of the signals on conductors 534 and 536 are evaluated to determine the phase error between the components of the demodulating signal and the IF carrier.

In order to change the phase of VCO 718 and therefore the phase of the demodulating signal, it is not enough to change the modulus of counter 720, as this changes the frequency of the demodulating signal. This will result in a phase progression and eventual phase coincidence. If the frequency is then not changed back to the original value, a phase disparity will occur and grow. In order to accomplish a step change in phase, a signal is applied to counter 720 over conductor set 550 at the end of each bit interval, when the phase error is determined.

Figure 7B:
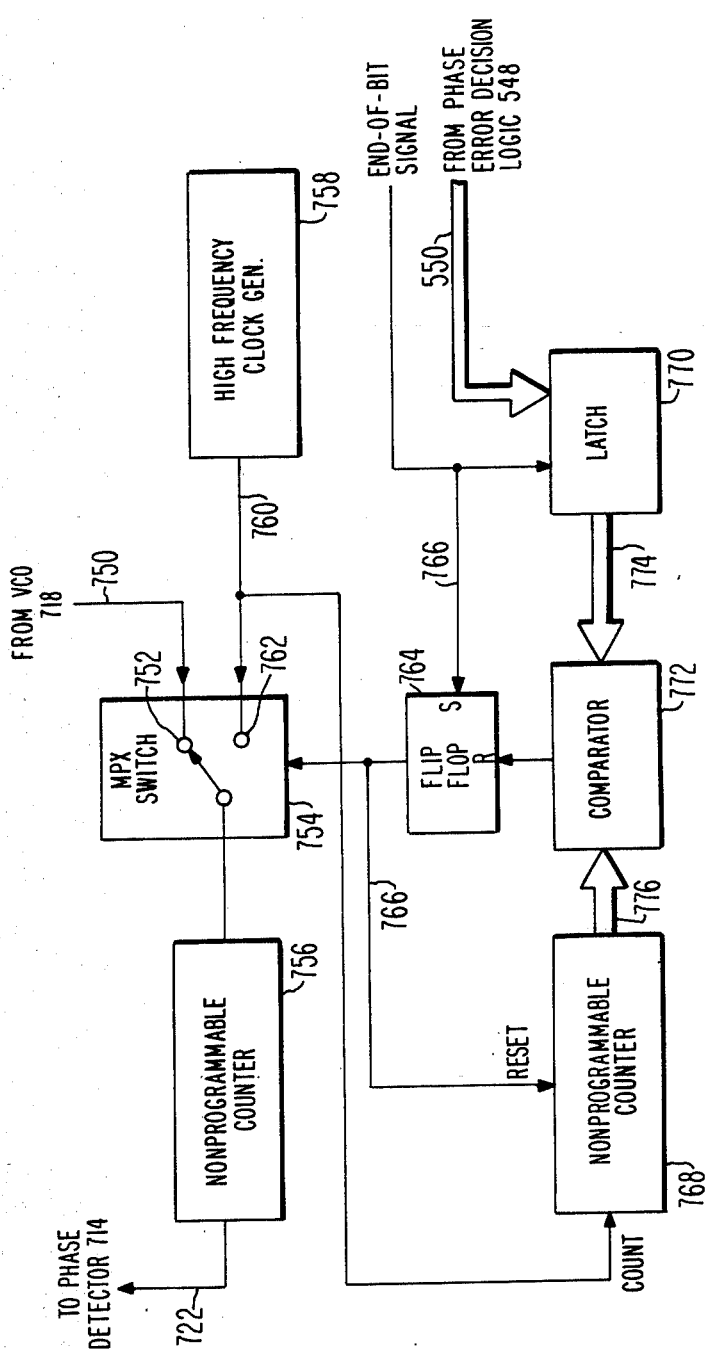

FIG. 7b illustrates an embodiment of programmable counter 720. In FIG. 7b, signal from VCO 718 is applied over a conductor 750 to an input terminal 752 of a multiplex (MPX) switch 754. In its normal operating mode, multiplex switch 754 couples signal from conductor 750 to a nonprogrammable counter 756. The count of counter 756 is preselected to provide in conjunction with the multiplication values of frequency multipliers 710 and 730 (FIG. 7a) to provide the desired multiplication of signal $f_M$ from oscillator 514 to a frequency of $(n-m)f_T$. The counted signal from counter 756 is applied over conductor 722 to phase detector 714. A clock source 758 produces on a conductor 760 a clock signal at a frequency greater than the frequency of VCO 718, which is applied to a second input terminal 762 of MPX switch 754. During those times in which high frequency clock 758 is coupled to counter 756, the count of counter 756 advances more rapidly than when the signal from VCO 718 is counted. Consequently, counter 756 will be advanced in phase (more quickly reach full count) after being momentarily coupled to count pulses from clock 758. Switch 754 is set to couple high frequency clock signals from clock generator 758 to counter 756 by a flip flop (FF) 764 which responds to a SET signal applied over a conductor 766 from a source (not illustrated) at the end of each bit interval. The set signal also triggers a latch which responds by latching the phase error signal from logic 548 at the end of each bit interval. When set, FF 764 produces on a conductor 766 a control signal which changes the position of MPX switch 754 to couple high frequency clock signals to counter 756 as described and which enables a nonprogrammable counter 768 to count high frequency clock pulses on conductor 760. The stages of counter 768 are coupled over conductor 770 to a multibit comparator 772 which compares the count of high frequency clock pulses with the latched count received over conductor 774. When the count of counter 768 equals the predetermined count stored in latch 770, the correct amount of phase advance has been achieved, and comparator 772 responds to the equality of resetting FF 764. When reset, FF 764 returns MPX switch 754 to the illustrated condition, and disables counter 768 by resetting its stages to zero. The phase correction is repeated near the end of each bit interval.

Figure 8:
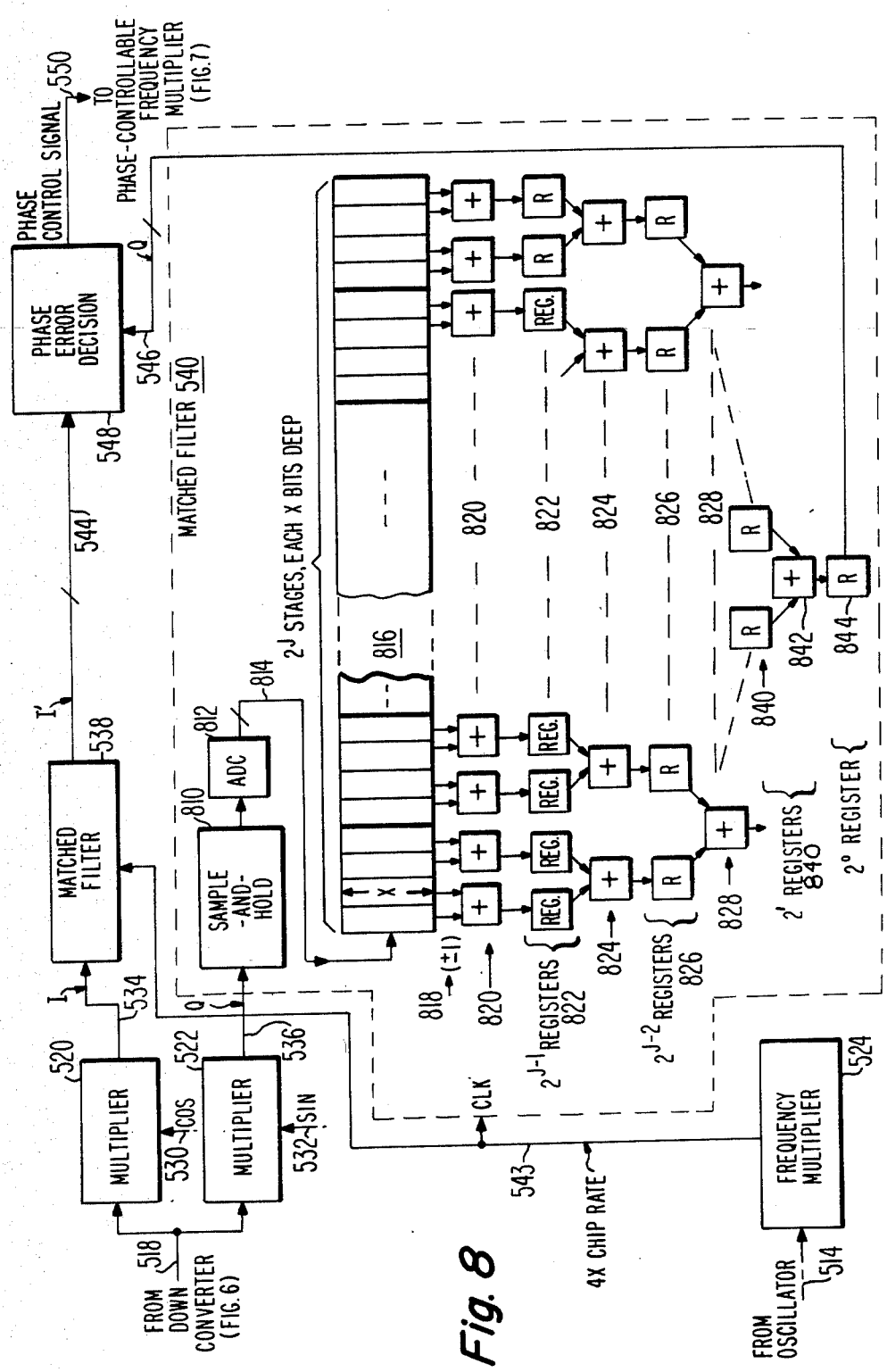
FIG. 8 is a block diagram illustrating details of a matched filter which is a portion of the receiver of FIG. 5.

FIG. 8 illustrates details of the matched filters of the receiver of FIG. 5. Matched filters 538 and 540 are identical, so only filter 540 is described in detail. Matched filter 540 receives demodulated Q signals over conductor 536 from multiplier 522. As mentioned, the I and Q signals are demodulated incoherently during the acquisition process, and are thereafter demodulated substantially coherently. The matched filtering of the I and Q signals is preferably accomplished in a digital apparatus, and therefore a clock signal must be supplied to matched filters 538 and 540. A clock signal is applied to filters 538 and 540 over a conductor 543 from frequency multiplier 524. As an example of a suitable rate, the clock may be at a rate of 4 times the chip rate. The Q signal is applied from conductor 536 to a sample-and-hold circuit 810 in which the Q value of each chip is sampled and held for a long enough time for an analog-to-digital converter (ADC) 812 to evaluate the signal from sample-and-hold 810. ADC 812 produces on a multiple conductor set 814 a parallel digital signal representative of each sampled analog value. It will be understood by those skilled in the art that parallel digital signals are carried by multiple conductor sets, and no distinction is made hereinafter between multiple conductor sets and single conductors. The digital signal from ADC 812 is applied to the input terminal of a shift register designated generally as 816. Shift register 816 has $2^J$ shift stages, each having sufficient bit depth to accommodate the signal from conductor 814. For example, each of the $2^J$ stages may have 4 bits. Shift register 816 is selected to contain as many stages as there are chips in the pseudorandom sequence encoding each bit of the signal which it is desired to receive. At a clock rate of four times the chip rate, each chip is represented by four individual shift register stages. If each bit of the signal which it is desired to receive was encoded at the transmitter by 1024 chips of pseudorandom sequence, shift register 816 must contain four times that number, or 4096 stages.

During reception, the demodulated and analog-to-digital converted Q signals are clocked through shift register 816. After each shift, each stage is sampled by a weighted tap. The weighted taps are collectively designated as 818. Since the PRS signal has only two values (logical ONE and logical ZERO), corresponding to ±1 the weighting consists simply of inversion or noninversion and is represented by the notation "±1" adjacent taps 818. Since each chip is sampled by a set of four adjacent taps, the weighting of each set of four taps is identical. The signals selected by weighted taps 818 are applied in pairs to the inputs of adders or summers designated collectively as 820. The outputs of each of the adders 820 is applied to a storage register 822. Each storage register must have sufficient bits to store the sum signal to the desired accuracy. Since each adder 820 receives inputs from two of the $2^J$ stages of shift register 816, the number of registers 822 required to store the sum signals produced by adders 820 is $2^{J-1}$. The outputs of registers 822 are applied in pairs to inputs of a plurality of summing circuits 824. These are $2^{J-2}$ summing circuits 824. Each summing circuit 824 produces a signal representing the output from four stages of shift register 816. At a clock rate of four times the chip rate, each chip of incoming signal is represented by four stages of shift register 816. Consequently, each adder 824 produces at its output a signal representative of the contents of shift register 816 over a duration of one chip interval.

The outputs of adders 824 are each applied to storage registers designated together as 826. Since each adder 824 has two inputs and only one output, only $2^{J-2}$ registers 826 are required. The outputs of registers 826 are applied in pairs to the inputs of a set of $2^{J-3}$ adders 828, thereby again reducing the number of signals to be further processed by a factor of two. The tree structure of adders and registers extends through a plurality of further stages (not illustrated). The last set of stages includes $2^1=2$ registers 840, the outputs of which are applied to the inputs of an adder 842. The output of adder 842 is applied to a register 844. The output of register 844 is a signal representing one bit of the signal which it is desired to receive. The signal produced by register 844 occurs $2^J$ cycles of the 4× chip rate clock after the moment during which the bit being represented precisely filled register 816. The amplitude represented by the digital signal produced by register 844 represents a unit amplitude of the received bit multiplied by the sine of the phase angle between the demodulating signal applied over conductor 532 to multiplier 522 and the carrier of the IF signal on conductor 518. This is decoded data and is designated Q'. In the case of matched filter 538, the output signal from a register (not separately illustrated) corresponding to register 844 appears on conductor 544 and represents the unit amplitude of the received bit multiplied by the cosine of the phase angle between the demodulating signal applied to multiplier 520 over conductor 530 and the carrier of the downconverted signal on conductor 518. This signal is also decoded data and is designed I'. As mentioned, if the demodulating signal applied to multiplier 520 is phase coincident with the IF carrier, the demodulating signal applied to multiplier 522 will be in phase quadrature with the IF carrier, and the I' and Q' signals on conductors 544 and 546 will each have unit amplitude multiplied by one and zero, respectively. To the extent that the phase of the demodulating signal applied to multipliers 520 and 522 differs from the ideal, the amplitudes of the I' and Q' will deviate from their ideal values.

As mentioned above, too large a frequency difference between the IF carrier of the signal on conductor 518 and the demodulating signal applied to multiplier 520 and 522 may result in a change in the phase angle between the demodulating signal on conductor 530 and the IF signal on conductor 518, and consequently in the relative amplitudes of the I and Q signals on conductors 534 and 536 over the duration of one bit interval. This in turn results in an amplitude taper of the signals in shift register 816 (and in the corresponding register in matched filter 538) as a result of the time required for the signal to traverse the shift register. This in turn results in an incorrect sum being produced on conductors 544 and 546 for application to phase error decision logic 548.

Figure 9:
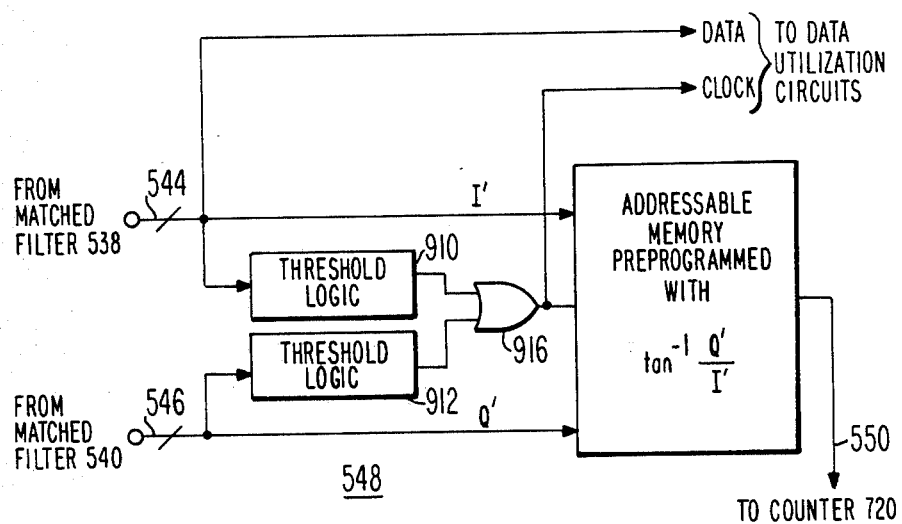
FIG. 9 is a block diagram illustrating details of a phase error decision portion of the receiver of FIG. 5.

Phase error decision logic 548 evaluates the I' and Q' signals on conductors 544 and 546 to establish the moment at which a bit has been received and also to produce a signal for correcting the phase of the demodulating signals applied to multipliers 520 and 522. In FIG. 9, the signals applied over conductor 544 from matched filter 538 are applied to the inputs of threshold logic circuit 910 and to a set of address input terminals of an addressable memory 914. Similarly, the signals from matched filter 540 are applied over conductor 546 to the inputs of a threshold logic circuit 912 and to a second set of address input terminals of addressable memory 914. Threshold logic circuits 910 and 912 evaluate the magnitude of the I' and Q' signals received on conductors 544 and 546, respectively, and produce and output signal when the associated signal reaches a predetermined threshold value. This threshold value is selected to be slightly larger than 0.707, corresponding to the sine or cosine of 45°, thereby guaranteeing that one or the other of threshold logic circuits 910 and 912 will respond to each received bit even if the sine or cosine components of the demodulating signal are displaced in phase by equal amounts from the IF carrier of the downconverted signal. If the phase of the demodulating signal is such that one of the sine and cosine components is closer than 45° to the IF carrier of the demodulating signal, there will be a large amplitude difference between the signals on conductors 544 and 546, and one of threshold logic circuits 910 and 912 will respond preferentially. The signals from logic circuit 910 and 912 are applied to inputs of an OR circuit 916, which combines the signals to produce a bit clock signal representing the fact that a bit of the desired signal has been received. This bit clock signal is applied from OR 916 to a clock input terminal of addressable memory 914, and is also applied as a data clock signal to data utilization circuits (not illustrated). Addressable memory 914 is addressed by the I' and Q' signals applied to its address input terminals and responds to the bit clock signal from OR 916 to apply to an output conductor 550 the contents of the accessed memory location. Memory 914 is preprogrammed with arctangent Q'/I' data. For example, if the magnitude of I' is unity and the magnitude of Q' is zero, thereby indicating that the demodulating signal is in correct phase, the corresponding memory location of 914 is preprogrammed with the value of the arctangent of 0° which is 0. Thus, the magnitude of the phase correction signal applied to conductor 550 in that case is 0. On the other hand, if the magnitude of I' is 0 and the magnitude of Q' is unity, the corresponding location in memory 914 is preprogrammed with the value 90, indicating that a 90° phase shift must be accomplished. The phase correction signal is applied by way of conductor 550 to programable counter 720 to accomplish the desired phase change, as discussed above. The digital value preprogrammed into each memory location depends upon the nominal frequencies of VCO 718 (FIG. 7a) and of high frequency clock 758 (FIG. 7b) and the number of clock 758 pulses necessary to establish the desired phase shift.

In operation prior to phase acquisition, the pilot carrier is continuously downconverted and phase locked to the signal from source 514 by control of the local VCO. During the phase acquisition process, downconverter 510 downconverts the pilot carrier phase coherent with the locally generated local oscillator signal, thereby simultaneously downconverting to IF the signals on the common band of frequencies, including the desired transmission encoded with the known pseudorandom sequence. Since the pilot signal and VCO frequency are already established, no lock-up time is required. The IF carrier of the downconverted signal is kept stable notwithstanding accuracy errors of the pilot carrier or of the transmitter, so long as their relative frequencies do not change quickly during the transmission, and in spite of motion of a satellite transponder through which both pilot signal and the desired encoded data signal pass on the way to the receiver. Since the frequency of the IF carrier of the desired signal is thus forced to be close to the frequency of the locally generated demodulating signal and its I and Q components, incoherent demodulation produces I and Q components of the encoded data which are substantially stable in amplitude over a duration equal to the time required for matched filtering, which may be one bit interval. Matched filtering of the incoherent signal is performed during the phase acquisition process, and the resulting I' and Q' pulses have amplitudes which represent the phase angle between the demodulating signal and the IF carrier. The phase error decision logic evaluates the amplitudes of the I' and Q' signals and produces a phase control signal which is applied to control the phase of the demodulating signal, whereupon acquisition is complete. Thereafter, demodulation is substantially coherent or synchronous. The coherently demodulated I and Q signals are applied to the matched filters, and one of the matched filters responds with signals representing data. Since the frequencies of the IF carrier of the demodulated signal and the demodulating signal do not correspond exactly, a residual phase error continues to accumulate. This phase error is small over a bit interval, and is corrected at the end of each bit interval.

Figure 10:
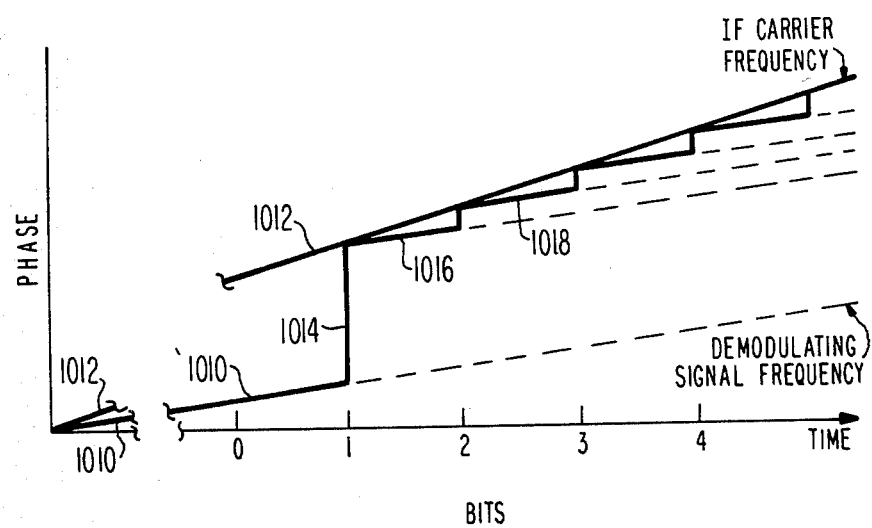
FIG. 10 is a plot of phase versus time for signals occurring in the receiver of FIG. 5, at times before, during, and after phase acquisition.

FIG. 10 illustrates this process. In FIG. 10, 1010 represents the phase progression as a function of time of the demodulating signal, and 1012 represents the phase progression of the IF carrier at a slightly different frequency. As illustrated, the IF carrier 1012 is at a slightly higher frequency than the demodulating signal 1010, as indicated by the slightly greater slope of line 1012 as compared with line 1010. Between time 0 and the time of the end of the first bit interval (time 1) the matched filters process the received incoherently demodulated signal to produce I' and Q' signals. At the end of the first bit interval, the logic circuits evaluate I' and Q' to produce a phase control signal, and the phase of the demodulating signal is step-corrected as indicated by line segment 1014 to become substantially phase coincident with the IF carrier. During the second bit interval (the interval between times 1 and 2) substantially coherent demodulation takes place. However, because the frequencies of the demodulating signals and the IF carrier continue to be slightly different, the phases of the IF carrier and the demodulating signal continue to diverge as indicated by the gradually increasing separation between line 1012 and line segment 1016. At the end of the second bit interval, a further step correction occurs, thereby bringing the demodulating signal once again into substantial phase with the IF carrier. During the third bit interval, substantially coherent demodulation again occurs, and some phase separation occurs as indicated by the separation between line 1012 and line segment 1018. This process continues throughout the duration of the reception. It will be noted that acquisition takes place in one bit interval, thereby allowing burst mode communication.

Other embodiments of the invention will be apparent to those skilled in the art. For example the data signal may be taken from conductor 546 if the phases of the demodulating signals are shifted by $\pi/2$. Combined amplitude and phase modulation (QAM) may be handled in a similar fashion by using, as known, weights other than ±1 in the matched filters.

What is claimed is:

1. A spread spectrum communications arrangement for communicating among a plurality of transmitter-receiver pairs by bursts of data in the form of pseudorandom sequence encoded data bits, comprising:

a transmission path subject to undesirable phase or frequency effects such that the frequency of a signal passing therethrough experiences a frequency offset;

a pilot signal generator coupled to a sending end of said transmission path for generating a pilot signal having a pilot frequency and for applying said pilot signal to said sending end;

a source of data to be transmitted;

transmitting means coupled to said source of data and including first clock generating means for producing a first clock signal having a nominal frequency which is an integer submultiple of said pilot frequency for clocking said source of data to produce clocked data at a frequency which is a second integer multiple of said frequency of said first clock signal, and including a modulator coupled to said source of data for PSK modulating said clocked data with a pseudorandom sequence having a chip frequency which is a third integer multiple of said frequency of said first clock signal to produce an encoded data signal, and including up-conversion means coupled to said first clock signal generating means and to said modulator for frequency-converting said encoded data signal to a transmitting frequency to produce an encoded transmitting frequency signal, and also including transmitting means coupled to said up-conversion means for coupling said encoded transmitting frequency signal to said sending end of said transmission path whereby said transmission path offsets said pilot frequency and said transmitting frequency to produce a frequency offset pilot signal and a frequency offset encoded data signal;

a receiver coupled to a receiving end of said transmission path for receiving said frequency offset pilot signal and said frequency offset encoded data signal, said receiver including downconversion means, quadrature detection means, matched filtering means and downconversion reference phase correction means;

said downconversion means comprising a second clock signal generator for generating a second clock signal having a second clock frequency which is a fourth integer submultiple of said pilot frequency, a downconverter coupled to said second clock signal generator and to said receiving end of said transmission path for receiving said offset pilot signal and said offset encoded data signal for mixing said offset pilot signal and said offset encoded data signal with a signal derived from said second clock signal to produce an intermediate frequency pilot signal having a pilot intermediate frequency and an intermediate frequency data signal having a data intermediate frequency in such a manner as to make said intermediate frequency pilot signal equal to a fifth integer multiple of said second clock signal, thereby setting the offset between said fifth integer multiple of said second clock signal and said data intermediate frequency at a frequency equal to the offset between said pilot frequency and said transmitting frequency;

said quadrature detection means comprising phase controllable demodulating signal generating means coupled to said second clock signal generator for generating a demodulation signal at a demodulation frequency which is a sixth integer multiple of said second clock frequency which is nominally equal to said data intermediate frequency and also comprising mixing means coupled to said demodulating signal generating means and to said downconversion means for demodulating said intermediate frequency data signal to form mutually quadrature undecoded I and Q components of demodulated data signal;

said matched filtering means being coupled to receive said undecoded I and Q components for generating decoded I and Q signals having amplitudes which are together representative of the phase angle between said demodulating signal and said intermediate frequency data signal; and said downconversion reference phase correction means is coupled to said matched filtering means and to said controllable demodulation signal generating means for generating from said decoded I and Q signals a phase control signal representative of said phase difference between said demodulating signal and said intermediate frequency data signal and for applying said control signal to said demodulating signal generating means for closing a control loop for correcting said phase difference between said demodulating signal and said intermediate frequency data signal.

2. An arrangement according to claim 1 wherein said transmission path comprises a satellite transponder.

3. An arrangement arrording to claim 1 wherein said downconversion means comprises:

mixing means including a first input terminal and a second input terminal, said first input terminal of said mixing means being coupled to said receiving end of said transmission path for receiving said offset pilot signal and said offset encoded data signal;

controllable oscillator means coupled to said second input terminal of said mixing means for controllably converting said offset pilot signal and said offset encoded data signal to said pilot intermediate frequency and to said data intermediate frequencies, respectively;

a phase detector including first and second input terminals, said first input terminal of said phase detector being coupled to said second clock signal generator for receiving said second clock signal;

a pilot intermediate frequency bandpass filter coupled to said mixing means and to said second terminal of said phase detector for coupling said intermediate frequency pilot signal to said second input terminal of said phase detector for generating from said phase detector a loop control signal indicative of the difference in phase between said intermediate frequency pilot signal and said second clock signal; and filter means coupled to said phase detector and to said controllable oscillator means for closing a phase lock loop whereby said intermediate frequency pilot signal is maintained in frequency and phase lock with said second clock signal.

4. An arrangement according to claim 3 further comprising a data intermediate frequency bandpass filter coupled to said mixing means for extracting said intermediate frequency data signal from said mixing means.

5. An arrangement according to claim 4 further comprising coupling means coupled to said quadrature detection means and to said data intermediate frequency bandpass filter for coupling said intermediate frequency data signals to said quadrature detection means.

6. An arrangement according to claim 5 wherein said coupling means comprises automatic gain control means.

7. An arrangement according to claim 1 wherein said controllable demodulating signal generating means comprises:
   phase detecting means including first and second input terminals, said first input terminal of said phase detecting means being coupled to said second clock signal generator for receiving a reference signal therefrom to be frequency multiplied;
   a controllable oscillator;
   programmable counting means coupled to said controllable oscillator and to said second input terminal of said phase detecting means for controllably dividing the frequency of said controllable oscillator to generate a counted signal for application to said second input terminal of said phase detecting means whereby said phase detecting means generates a loop control signal representative of the phase difference between said counted signal and said reference signal;
   filter means coupled to said phase detecting means for receiving said loop control signal therefrom for filtering said loop control signal and for coupling filtered loop control signal to said controllable oscillator for control of the frequency thereof, thereby closing a phase-lock loop for generating said demodulation signal at a frequency nominally equal to said data intermediate frequency.

8. An arrangement according to claim 7 wherein said quadrature detection means further comprises phase shifting means coupled to said phase lock loop for generating mutually quadrature components of said demodulating signal.

9. An arrangement according to claim 7 wherein said programmable counting means comprises:
   high frequency clock generating means;
   nonprogrammable counting means;
   multiplex switch means coupled to said controllable oscillator, said high frequency clock generating means and to said nonprogrammable counting means for coupling said nonprogrammable counting means selectively to said controllable oscillator and to said high frequency clock generating means; and
   multiplex control means coupled to said multiplex switch means and to said downconversion reference phase correction means for coupling one of said controllable oscillator and said high frequency clock generating means to said nonprogrammable counting means under control of said phase control signal representative of said phase difference between said demodulating signal and said intermediate frequency data signal.

10. An arrangement according to claim 1 wherein said matched filtering means comprises:
    first and second tapped delay means coupled to said second clock signal generator for receiving a shift clock signal at a frequency which is a seventh integer multiple of said second clock frequency, and coupled to said quadrature detection means for separately receiving said undecoded I and Q components, respectively, of said demodulated data signal for decoding said undecoded demodulated data signal with said pseudorandom sequence.

11. An arrangement according to claim 10 wherein said first tapped delay means comprises:
    a shift register coupled to said mixing means for receiving one of said undecoded I and Q components and coupled to said second clock signal generator for receiving as a shift signal said shift clock signal; and
    weighted summing means coupled to stages of said shift register for decoding said one of said undecoded I and Q components.

12. An arrangement according to claim 1 wherein said downconversion reference phase correction means comprises:
    threshold means coupled to said matched filtering means for receiving said decoded I and Q signals for responding to values of at least one of said decoded I and Q signals exceeding a predetermined threshold for generating a bit received signal representative of reception of a predetermined portion of said data;
    addressable memory means coupled to said threshold means for receiving said bit received signal therefrom for being enabled thereby, and coupled to said matched filtering means for receiving said decoded I and Q signals therefrom for being addressed thereby, said addressable memory means being preprogrammed at addressable memory locations with phase information related to the ratio of said decoded Q signal to said decoded I signal for generating said phase control signal from said phase information in response to said bit received signal.

13. An arrangement according to claim 12 wherein said threshold means comprises:
    first threshold logic means coupled to receive said decoded I signal for comparing said decoded I signal with a first threshold value and for generating a first bit received component signal in response to a value of said decoded I signal exceeding said first threshold value;
    second threshold logic means coupled to receive said decoded Q signal for comparing said decoded Q signal with a second threshold value and for generating a second bit received components signal in response to a value of said decided Q signal exceeding said second threshold value; and
    combinational logic means coupled to said first and second threshold logic means for receiving said first and second bit received component signals for generating said bit received signal.

14. A method for receiving spread-spectrum encoded data signals which have been upconverted to a particular frequency range and which are associated with a pilot carrier, comprising the steps of:
    generating a local oscillator signal;

downconverting said spread-spectrum encoded data signals and said pilot signal by mixing said spread-spectrum data signals and said pilot signal to an intermediate frequency range by use of said local oscillator signal to produce an encoded IF data signal and an IF pilot signal;

generating a reference frequency signal;

controlling the frequency of said local oscillator signal in such a fashion that said IF pilot signal is locked to said reference frequency signal whereby said encoded IF data signals are associated with an IF carrier having an IF carrier frequency;

generating mutually quadrature demodulating signals at a frequency near said IF carrier frequency;

separately mixing each of said mutually quadrature demodulating signals with said encoded IF data signals to produce inphase and quadrature components of demodulated encoded data signals;

match-filtering said inphase and quadrature components of said encoded data signals to produce decoded inphase and decoded quadrature signals, respectively, the amplitudes of which are related to the phase angle between said demodulating signals and said IF carrier;

evaluating the amplitudes said decoded inphase and decoded quadrature signals to generate a control signal representative of said phase differences between said demodulating signals and said IF carrier; and controlling the phase of said mutually quadrature demodulating signals with said control signal in a manner selected to reduce said phase differences between at least one of said demodulating signals and said IF carrier.

15. A method according to claim 14 wherein said step of controlling the frequency of said local oscillator signal comprises the steps of:

separating said encoded IF data signal from said IF pilot signal by bandpass filtering to produce a separated IF pilot signal;

comparing at least the phase of said IF pilot signal with said reference frequency signal to produce a local oscillator phase control signal;

filtering said local oscillator phase control signal to generate a filtered control signal; and controlling said frequency of said local oscillator signal by means of said filtered control signal.

16. A receiving apparatus for receiving spread-spectrum data signals lying in a band of frequencies and associated with a pilot carrier, comprising;

controllable local oscillator means;

first mixing means adapted for receiving said spread-spectrum data signals and said pilot carrier, and coupled to said local oscillator means for receiving said local oscillator signal for downconverting said spread-spectrum data signals and said pilot carrier to a range of intermediate frequencies for generating an intermediate frequency encoded data signal and an intermediate frequency pilot signal;

separating means coupled to said first mixing means for separating said intermediate frequency encoded data signal from said intermediate frequency pilot signal;

a source of a local frequency reference signal selected to be equal in frequency to the desired frequency of said intermediate frequency pilot signal;

phase detecting means coupled to said separating means and to said source of local frequency reference signal for comparing said intermediate frequency pilot signal with said local frequency reference signal for generating a signal representative of at least the phase difference therebetween;

coupling means coupled to said controllable local oscillator means and to said phase detecting means for closing a phase-lock loop for controlling said local oscillator means in such a manner as to maintain said intermediate frequency pilot signal in phase coherence with said local frequency reference signal, whereby the carrier of said intermediate frequency encoded data signal is constrained within a limited range of frequencies;

phase controllable demodulating signal generating means for generating first and second mutually phase quadrature demodulating signals at a frequency within said limited range of frequencies;

second mixing means coupled to said separating means for receiving said intermediate frequency encoded data signal and coupled to said demodulating signal generating means for demodulating said intermediate frequency encoded data signal to produce baseband inphase and quadrature encoded data components in response to said first and second mutually phase quadrature demodulating signals, respectively;

matched filtering means coupled to said second mixing means for decoding said inphase and quadrature encoded data components to produce decoded inphase and quadrature amplitude signals the relative amplitude of which depend upon the phase difference between said first and second mutually phase quadrature demodulating signals and said carrier of said intermediate frequency encoded data signal;

phase determining means coupled to said matched filtering means for processing said decoded inphase and quadrature amplitude signal to produce a phase control signal representative of the phase difference between one of said said first and second mutually phase quadrature demodulating signals and said carrier of said intermediate frequency encoded data signal; and control signal coupling means coupled to said phase determining means and to said phase controllable demodulating signal generating means for controlling the phases of said demodulating signals in response to said phase control signal in a manner tending to reduce the phase difference between said one of said first and second mutually phase quadrature demodulating signals and said carrier of said intermediate frequency encoded data signals.

17. Apparatus according to claim 16 wherein said separating means comprises bandpass filtering means coupled to said first mixing means and having a bandpass characteristic centered on a frequency near the frequency of said intermediate frequency pilot signal.

18. Apparatus according to claim 16 wherein said separating means comprises further bandpass filtering means coupled to said first mixing means and having a bandpass characteristic centered on a frequency near the carrier frequency of said intermediate frequency encoded data signal.

19. Apparatus according to claim 16 wherein said coupling means comprises a low pass filter.

20. Apparatus according to claim 16 wherein said source of local frequency reference signal comprises;

oscillation means having a nominal frequency equal to an integer submultiple of the frequency of said pilot carrier; and frequency multiplication means coupled to said oscillation means for multiplying the frequency of the signal therefrom by an integer.

* * * * *